US010685515B2

(12) United States Patent
Hazebrouck et al.

(10) Patent No.: US 10,685,515 B2
(45) Date of Patent: Jun. 16, 2020

(54) IN-VEHICLE LOCATION UNCERTAINTY MANAGEMENT FOR PASSIVE START

(71) Applicant: Ford Global Technologies, LLC, Dearborn, MI (US)

(72) Inventors: Laura Viviana Hazebrouck, Birmingham, MI (US); Vivekanandh Elangovan, Canton, MI (US); Erick Michael Lavoie, Dearborn, MI (US); Ali Hassani, Ann Arbor, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/126,650

(22) Filed: Sep. 10, 2018

(65) Prior Publication Data

US 2020/0082653 A1 Mar. 12, 2020

(51) Int. Cl.
*G07C 9/00* (2020.01)
*G01S 11/06* (2006.01)
*G01S 13/60* (2006.01)
*G01S 5/02* (2010.01)

(52) U.S. Cl.
CPC ........ *G07C 9/00309* (2013.01); *G01S 5/0294* (2013.01); *G01S 11/06* (2013.01); *G01S 13/60* (2013.01); *G07C 2009/00325* (2013.01); *G07C 2009/00547* (2013.01)

(58) Field of Classification Search
None
See application file for complete search history.

(56) References Cited

U.S. PATENT DOCUMENTS

| 4,796,191 A * | 1/1989 | Honey .................. G01C 21/14 |
| | | 701/445 |
| 5,899,957 A * | 5/1999 | Loomis .................. G01S 19/04 |
| | | 340/988 |
| 6,906,612 B2 | 6/2005 | Ghabra et al. |
| 8,103,446 B2 * | 1/2012 | Yokota ............. G08G 1/096827 |
| | | 340/995.15 |
| 8,332,402 B2 * | 12/2012 | Forstall ............... G06F 16/9535 |
| | | 707/736 |
| 8,571,725 B2 | 10/2013 | Juzswik |
| 9,008,917 B2 | 4/2015 | Gautama et al. |
| 9,366,764 B2 * | 6/2016 | Sun ........................ G01C 21/165 |
| 9,536,364 B2 | 1/2017 | Talty et al. |
| 9,694,787 B2 | 7/2017 | Kornek et al. |

* cited by examiner

*Primary Examiner* — K. Wong
(74) *Attorney, Agent, or Firm* — Frank Lollo; Eversheds Sutherland (US) LLP

(57) ABSTRACT

Method and apparatus are disclosed for managing location uncertainty areas for a passive start system of a vehicle. An example vehicle includes antenna modules for determining signal strengths of communication with a mobile device. The example vehicle also includes a wireless module configured to, when the mobile device is in a location uncertainty area (LUA), determine first and second location predictors. The wireless module is also configured to enable passive start when the first and second location predictors both indicate the mobile device is inside the vehicle. The wireless module is further configured to disable passive start if the mobile device is outside the vehicle.

20 Claims, 3 Drawing Sheets

IN-VEHICLE LOCATION UNCERTAINTY MANAGEMENT FOR PASSIVE START

TECHNICAL FIELD

The present disclosure generally relates to passive entry passive start (PEPS) systems of a vehicle and, more specifically, management of in-vehicle location uncertainty for a mobile device used in connection with the PEPS system.

BACKGROUND

Increasingly, vehicles are being manufactured with passive entry and/or passive start (PEPS) systems. In PEPS systems, the vehicle controls various functions of the vehicle based on the location of the driver's key fob or mobile device (e.g. when the vehicle includes a "phone-as-a-key (PaaK)" system) relative to the vehicle. For example, when the mobile device is three meters from the vehicle, the vehicle may engage a welcome mode that illuminates the exterior lights of the vehicle and adjust the cabin to suite the driver preferences and at two meters, the vehicle may enable a passive entry event based on trigger from the user such as sensing a hand touching a door handle or a foot kicking under the fascia.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for location uncertainty management for a passive start system of a vehicle. An example vehicle includes antenna modules for determining signal strengths of communication with a mobile device. The example vehicle also includes a wireless module configured to, when the mobile device is in a location uncertainty area (LUA), determine first and second location predictors. The wireless module is also configured to enable passive start when the first and second location predictors both indicate the mobile device is inside the vehicle, and disable passive start if the mobile device is outside the vehicle.

An example method includes determining, with antenna modules of a vehicle, signal strengths of communication with a mobile device. The method also includes, when the mobile device enters a location uncertainty area (LUA), determining first and second location predictors. The method further includes enabling passive start when the first and second location predictors both indicate the mobile device is inside the vehicle. And the method still further includes disabling passive start if the mobile device is outside the vehicle.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
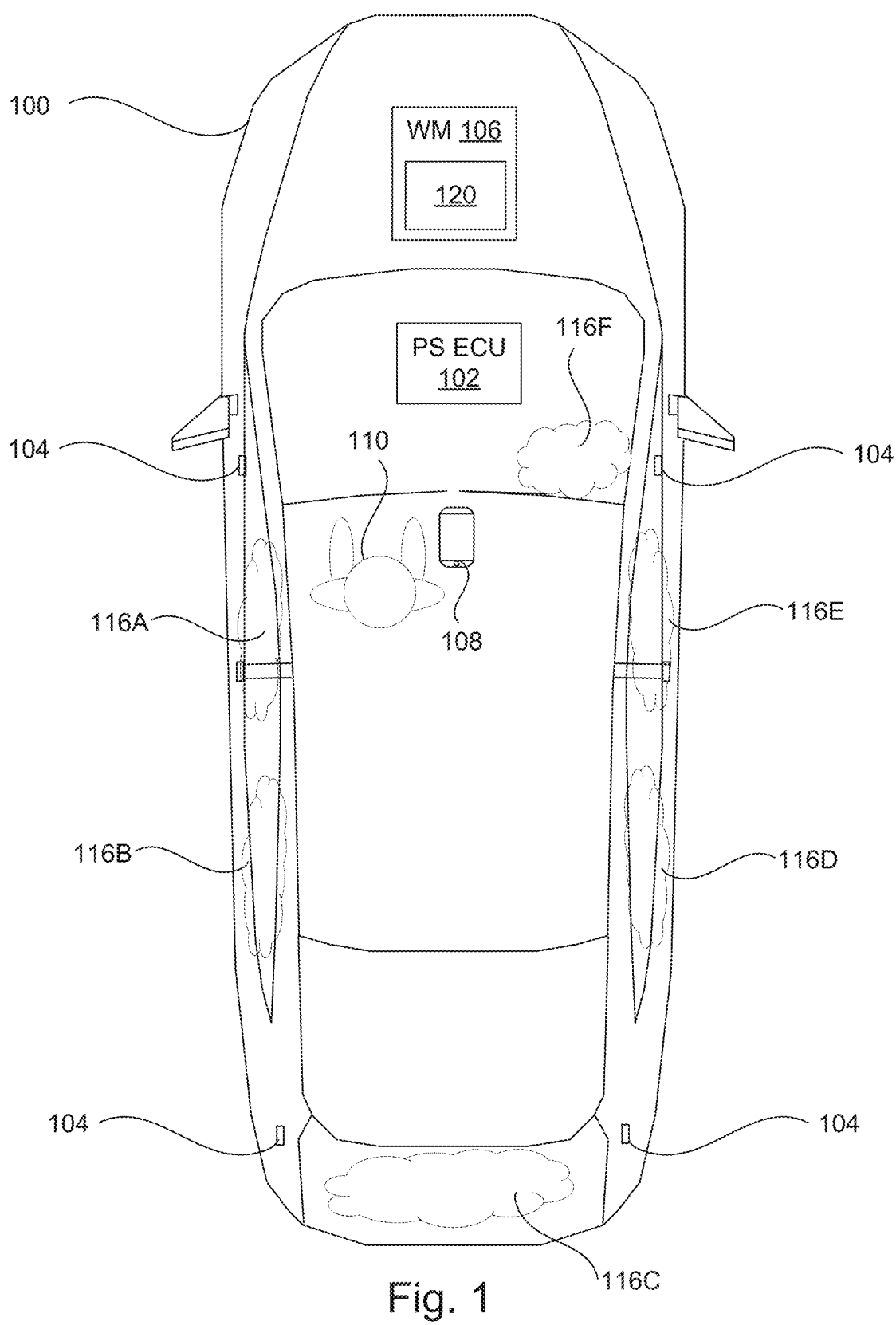
FIG. 1 illustrates a vehicle operating in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Passive entry passive start (PEPS) systems facilitate an operator using various features of a vehicle while keeping the key within the proximity of the vehicle. These features include a welcome/farewell mode, passive entry, and passive start. At a first distance (e.g., three meters, etc.) from the vehicle, the PEPS system activates a welcome/farewell mode that, for example, illuminates the exterior lights of the vehicle and/or change setting of the interior system (e.g., the seat position, the steering wheel position, the radio presets, etc.) to the preferences of the operator associated with the mobile device and/or key fob. If the user exits this first zone without exercising a passive entry event, the vehicle will perform a farewell sequence. At a second distance (e.g., two meters, etc.), the PEPS system primes one or more doors to be opened. As used herein, "priming" refers to sending a signal to a door control unit to authorize unlocking the door in response to detecting a hand on the door handle. When a door has been primed, the PEPS system (e.g., via a door control unit) unlocks the door in response to detecting (e.g., via a touch sensor, an infrared sensor, or a camera, etc.) the hand of the operator to be proximate to the door when the authorized mobile device and/or key fob is also in the passive entry zone.

When the authorized mobile device and/or key fob is inside the vehicle, the PEPS system may enable passive start. The detection of a mobile device and/or key fob inside the vehicle disables the immobilizer and enables a push-button ignition switch.

The PEPS system tracks the location of an authorized mobile device (e.g., a smart phone, a smart watch, tablet, a key fob, etc.) and activates these features based on the location of the mobile device relative to the vehicle. To localize the mobile device, the vehicle includes antenna modules and a wireless communication module. The antenna modules provide wireless communication coverage within an area around the vehicle to communicate with the mobile device. The antenna modules implement a personal area network protocol (e.g., Bluetooth® Low Energy (BLE), Z-Wave®, ZigBee®, etc.) or a wireless local area network (WLAN) protocol (including IEEE 802.11 a/b/g/n/ac/p or others). When the antenna modules implement BLE, the antenna modules are sometimes referred to as "BLE Antenna Modules (BLEAMs)" and the wireless communication module is sometimes referred to as a "BLE Module (BLEM)." The antenna modules measure a signal strength value, such as a received signal strength indicator (RSSI) and/or a reception strength (RX) value, of signals from the mobile device. The RSSI and RX values measure the open-path signal strength of the radio frequency signal as received by the antenna module from the mobile device. Open path may be different than a free path or line of sight measurement, however it may also include the free path or line of sight measurement. The RSSI is measured in signal strength percentage, the values (e.g., 0-100, 0-137, etc.) of which are defined by a manufacturer of hardware used to implement the antenna modules. Generally, a higher RSSI means that the mobile device has less interference and/or is closer to the corresponding antenna modules. The RX values are measured in Decibel-milliWatts (dBm). For example, when the mobile device is one meter (3.28 feet) away, the RX value may be −60 dBm, and when the mobile device is two meters (6.56 feet) away, the RX value may be −66 dBm. The wireless communication module uses the RSSI/RX values to determine the radial distance from the mobile device to the particular antenna modules with the RSSI decreasing in value as distance increases. In some examples, the wireless communication module uses the RSSI/RX values from multiple antenna modules to triangulate the location of the mobile device relative to the vehicle.

Because of the layout of the antenna modules and/or interaction between the antenna modules and the antenna of the mobile device, the coverage provided by the antenna modules may result in location uncertainty areas (LUAs) in certain areas both inside and outside the vehicle. As used herein, an "LUA" is an area inside or outside the vehicle that is within the theoretical range of the antenna modules but, because of the geometries of the vehicle, environmental factors, the coverage areas of the antenna modules and/or the antenna geometry of the mobile device, the antenna modules cannot accurately measure the signal strength of the mobile device and/or the signals from the mobile device are not receivable by the antenna modules. For example, the aforementioned factors may cause signals from the mobile device to be reflected, absorbed, and/or distorted such that the wireless communication module cannot determine which antenna module the mobile device is closest too based on the signal strength measurements from the antenna modules. That is, in such an example, the wireless communication module cannot rely on the signal strength measurements to determine the location of the mobile device.

In some examples described herein, the LUAs may refer only to those that are inside the vehicle. These may include areas inside the vehicle doors (pockets, armrests, etc.), in the trunk, in the glove box, or some other interior area of the vehicle. Other examples may refer to external LUAs (which may still be within the Passive Entry Passive Start (PEPS) zone), such as areas outside the trunk, under the vehicle, and more. Still other examples may refer to both internal and external LUAs.

Because the antenna modules may not accurately measure the signal strength relative to the distance of the mobile device in an LUA, the wireless communication module may be unable to track the location of the mobile device within the PEPS and Welcome mode zone. Adding more antenna modules to provide coverage in the these LUA zones adds complexity to the hardware and wiring of the vehicle, where additional mounting locations for such extra antenna modules may not be available due to packaging constraints.

As described below, the wireless communication modules tracks the movement of the mobile device and, when the mobile device enters an LUA (e.g., the mobile device is moved to the glove box, a door pocket, or some other area preventing or impeding a determination of the mobile device location), the wireless communication module estimates the current location of the mobile device based on the past locations of the mobile device and/or past signal strength values measured by the antenna module. When the wireless communication module determines that the mobile device is within an LUA, the wireless communication module generates two or more predictions of locations (sometimes referred to as "location predictors" or "predictors") of the mobile device. In some examples, the wireless communication module uses multiple different techniques to generate the predictions of the locations of the mobile device. For example, the wireless communication module may use one or more of a linear quadratic equation, a Bayesian Net, a Neural Net, a Kalman filter, a perceptron, double exponential smoothing algorithm, a Markov Chain, and/or a reinforcement learning agent. A predictor may also be a cascade of predictors, wherein one predictor generates a feature space, and the other classifies the state based off said space; an example would be utilizing a convolutional net to generate features for a reinforcement learning agent. When the multiple predictors match to each other predictors, the wireless communication module so indicates to the passive start electronic control unit (PS ECU). In some examples, the multiple predictors match when the predictors indicate that the mobile device is in a particular defined LUA (e.g., the glove box). In some such examples, the multiple predictors match when the predictors indicate that the mobile device is within a threshold distance of an LUA, or that positions determined by the various predictors are within a threshold distance from each other (e.g., within 5 inches). Alternatively, in some examples, to reduce processing, the wireless communication module uses a single predictor to determine when the mobile device is in one of the LUAs inside the vehicle.

In response to receiving the indication from the wireless communication module, the PS ECU may determine whether to enable or disable a passive start system of the vehicle. In some examples, the PS ECU enables passive start for a threshold period of time (e.g., three seconds, five seconds, ten seconds, etc.). In some examples, when the mobile device exits the LUA such that the antenna module (s) can accurately measure signals from the mobile device, the wireless communication module acts according to signal strength of the mobile device regardless of determinations made when the mobile device was in the LUA.

FIG. 1 illustrates a vehicle 100 operating in accordance with the teachings of this disclosure. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example the vehicle 100 includes a passive start ECU (PS ECU) 102, antenna modules 104, and a wireless communication module (WM) 106.

The PS ECU 102 controls various subsystems of the vehicle 100, particularly those relating to controlling whether the vehicle can start based on the presence of an authorized mobile device 108 inside the vehicle. When the authorized device 108 is determined to be positioned inside the vehicle, the PS ECU enables a push button or other user interface device to be operated by a user to start the vehicle.

The antenna modules 104 may include hardware (e.g., processors, memory, storage, antenna, etc.) and software to control wireless network interface(s). The antenna modules 104 include a communication controller for a personal or local area wireless network (e.g., Bluetooth®, Bluetooth® Low Energy (BLE), Zigbee®, Z-Wave®, Wi-Fi®, etc.). In some examples, when the antenna modules 104 are configured to implement BLE, the antenna modules 104 may be referred to as "BLE Antenna Modules (BLEAMs)." The antenna modules 104 communicatively couple to the mobile device 108 and measure and/or receive measurements of the signal strength of the signals broadcast by the mobile device 108. Four antenna modules 104 are illustrated in FIG. 1, however it should be noted that there may be more or fewer antenna modules, and their positions inside and outside of vehicle 100 may be different from those positions shown in FIG. 1.

In the illustrated example, the antenna modules 104 receive signals from the mobile device 108. In the illustrated example, LUAs 116A-F are areas inside vehicle 100 that are not covered by one or more of the coverage areas of the antenna modules 104, such that the antenna modules 104 cannot accurately or confidently measure the broadcasts from the mobile device 108. The area encompassed by the LUAs 116A-F are determined based on the coverage of the antenna modules 104, as well as the antenna of the mobile device 108. In the illustrated example, LUAs 116A, 116B, 116D, and 116E correspond to the doors of the vehicle, LUA 116C corresponds to a portion of the trunk of vehicle 100, and LUA 116F corresponds to a glove box of vehicle 100. It should be noted that many other LUAs may be present, and the size, shape, and other characteristics of the LUAs may differ.

The wireless communication module 106 is communicatively coupled to the antenna modules 104 to track a location of the mobile device 108 relative to the vehicle 100. In some examples, when the antenna modules 104 are configured to implement BLE, the wireless communication module 106 may be referred to as a "BLE Module (BLEM)." The wireless communication module 106 receives and analyzes the signal strength measurements between the antenna modules 104 and the mobile device 108, and based on these measurements, the wireless communication module 106 determines (a) whether the mobile device 108 is inside or outside the vehicle 100, (b) where in particular the mobile device 108 is when it is inside vehicle 100, (c) whether mobile device 108 is within one of the LUAs 116A-F, and (d) when in one of the LUAs 116A-F, the estimated location of the mobile device 108. In the illustrated example, the wireless communication module 106 includes an LUA manager 120.

The LUA manager 120 analyzes the signal strength measurements from the mobile device 108 that are received by the antenna modules 104. Periodically (e.g., every 500 milliseconds, every second, etc.), the LUA manager 120 stores a sample of the signal strength measurement in memory (e.g., in the memory 206 of FIG. 2 below). In some examples, the LUA manager 120 collects the signal strength measurements starting when the mobile device 108 is first detected and/or determined to be inside vehicle 100. When the mobile device 108 is inside vehicle 100, the LUA manager 120 calculates a location of the mobile device 108 with respect to one or more of the antenna modules 104. In some examples, the LUA manager 120 calculates a radial distance when the mobile device 108 is detected by one of the antenna modules 104. In some examples, the LUA manager 120 uses triangulation or trilateration to determine the location of the mobile device 108 when signals from mobile device 108 are detected by multiple antenna modules 104. Using the location of the mobile device 108, the LUA manager 120 may determine when the mobile device 108 is within a zone of interest (e.g., a specific passive start zone, etc.) and sends a message so indicating to the PS ECU 102.

The LUA manager 120 may determine when the mobile device 108 enters one of the LUAs 116A-F. In some examples, the LUA manager 120 determines that the mobile device 108 has entered one of the LUAs 116A-F when the previous signal strength measurements indicate that the mobile device 108 was previously moving towards a particular LUA. In some examples, the LUA manager 120 may determine that the mobile device 108 has entered one of the LUAs 116A-F when the LUA manager 120 cannot determine which of the antenna modules 104 the mobile device 108 is closest to, based on multiple signal strength measurements from the antenna modules 104. When the mobile device 108 enters one of the LUAs 116A-F, the LUA manager 120 may estimate the current location of the mobile device 108 based on past signal strength values associated with the mobile device 108 stored in memory 206.

The LUA manager 120 may also factor in various other data and sources of information. For instance, this data may include (a) the mobile device 108 may provide inertial data that can be used for dead reckoning in combination with a past known mobile device location, (b) the presence of a wired connection to the vehicle (e.g., USB connection, auxiliary cord connection, etc.), (c) the presence of the mobile device on a wireless charging pad having a known location in the vehicle, (d) an analysis of sound from a microphone of the mobile device compared to a model (e.g., using sound captured by the mobile device to determine that it is in a door pocket, trunk, glove box, etc.), (e) an analysis of camera data from the mobile device compared to a model (e.g., using image(s) captured by the mobile device to determine that it is in a door pocket, trunk, glove box, etc.), (f) an analysis of motion of the mobile device relative to the vehicle (e.g., comparing the acceleration and heading of the mobile device to the acceleration and heading of the vehicle), (G) GPS data, and more.

The LUA manager 120 may generate one or more predictors of the location of the mobile device 108 using models. In some examples, one or more models may be generated using data gathered by mapping signal strength of the mobile device 108 as it transitions from various ranges of interest (such as outside the vehicle, a welcome zone, a passive entry zone, out of range, in an LUA, etc.). In some examples, one or more models may also be generated using data received from the mobile device 108 such as those data described above, particularly any dead reckoning data, charging or wired connections, analysis of sound and camera data from the mobile device, and analysis of motion of the mobile device and vehicle 100. Other data may be used as well.

In some examples, the detection of mobile device 108 via a wired or charging connection may be used to determine that the mobile device is located inside vehicle 100.

When more than one location predictor is generated, the LUA manager 120 may use a different model to generate each of the predictors. In some examples, the behavior of the mobile device 108 is determined by a third party (e.g., a car manufacturer, a component manufacturer, etc.). In some such examples, the behavior is measured for different models of mobile devices so that particular models are generated for particular models and/or manufacturers of mobile devices 108. Alternatively, in some examples, the behavior of the particular mobile device 108 is measured over time as the mobile device 108 interacts with the antenna modules 104. In such an example, the models are developed over time and are custom to the mobile device 108 of the operator 110. In some examples, the LUA manager 120 includes at least two models generated using different algorithms.

In some examples, the models are generated using a quadratic linear equation, a Kalman filter algorithm, a double exponential smoothing algorithm, a Markov Chain algorithm, a Bayesian Net algorithm, a neural net algorithm, and/or a perceptron algorithm, etc. The models use information regarding the mobile device 108 to generate the predictors, such as (a) the states or zones (e.g., the welcome zone, the passive entry zone, being in range of the antenna modules 104, etc.) that the mobile device 108 was in previously, (b) the history of the signal strength measurements of the antenna modules 104, (c) the current signal strength measurements of the antenna modules 104, (d) various other information gathered by the mobile device 108 (audio data, visual data, inertial data, etc.), and/or (e) higher order terms of these inputs, such as gradient, Laplacian, Fourier transform, etc. For example, a Markov Chain model may define five states which characterize the relationship of the mobile device 108 to the vehicle 100, and/or the location of the mobile device 108 with respect to the vehicle 100. In such an example, the Markov Chain model may define an in-range state (e.g., the mobile device 108 is in the communication range of the vehicle 100), an out-of-range state (e.g., the mobile device 108 is not in the communication range of the vehicle 100), approach detection state (e.g., the mobile device 108 is within the welcome zone), a passive entry state (e.g., the mobile device 108 is within the passive entry zone), a passive start state (e.g., the mobile device 108 is within the passive start zone) and an indeterminate state. Other states may include the various LUAs 116A-F. In such examples, the Markov Chain model may define transitions between the defined states based on the (a) states or zones (e.g., the welcome zone, the passive entry zone, the passive start zone, being in range of the antenna modules 104, etc.) that the mobile device 108 was in previously, (b) the history of the signal strength measurements of the antenna modules 104, (c) the current signal strength measurements of the antenna modules 104, and/or (d) various other information gathered by the mobile device 108 (audio data, visual data, inertial data, etc.). The transition probabilities may be experimentally determined for a variety of conditions that are known to result in LUAs. In such an example, to generate a predictor, the inputs into the Markov Chain model may produce a final state. For example, when the final state is LUA 116A, the predictor may indicate that mobile device 108 is in LUA 116A even when the wireless communication module 106 cannot determine the current location of the mobile device 108. This model may be also analogously applied to a reinforcement learning agent, where a reward system is defined for correct transitions and semi-supervised learning is performed on a mix of labelled and unlabeled data.

The LUA manager 120 may generate one or more location predictors using these models that are estimates of the location of the mobile device 108 within vehicle 100, and/or a more specific location within a particular LUA 116A-F. In some examples, the LUA manager 120 generates one predictor and uses that predictor as the basis for deciding whether the mobile device 108 is inside the vehicle, and/or within a particular passive start zone. In some examples, the LUA manager 120 generates multiple predictors. For example, a first predictor may be generated using a Kalman filter-based model and a second predictor may be generated using a Markov Chain-based model. The LUA manager 120 may estimate the location of the mobile device 108 when the predictors substantially match (e.g., are within 0.25 meters of the same location, indicate that the mobile device 108 is within the same zone, etc.). The LUA manager 120 may then treat the mobile device 108 as if it is at the location indicated by the predictors. The LUA manager 120 uses that location to determine which, if any, zone that the mobile device 108 is in, whether to enable or disable passive start, and more. The LUA manager 120 may continue to estimate the location of the mobile device 108 until it determines that the mobile device 108 is no longer in one of the LUAs 116A-F. In some examples, the LUA manager 120 may periodically (e.g., every 500 milliseconds, every second, etc.) generate the predictors and estimate the location of the mobile device 108 with respect to the vehicle 100 regardless of whether the mobile device 108 is within one of the LUAs 116A-F. In such examples, the LUA manager 120 may use the most recently generated predictors to estimate the location of the mobile device 108.

In some examples, the wireless module 106 may be configured to disable passive start if the mobile device 108 is determined to be located outside the vehicle 100. This may occur if the mobile device transitions from inside the vehicle to outside the vehicle as a driver exits the vehicle, if the mobile device 108 falls out an open window, or for any number of other reasons. Where the vehicle is in motion when the mobile device 108 is determined to be outside the vehicle, the vehicle may continue to allow a user to drive the vehicle. However, the driver may be prevented from restarting the vehicle if it is shut off. Alternatively, upon detecting that the mobile device is no longer in the vehicle, the vehicle may display an alert indicating that the mobile device has been dropped and provide the user a short window of time to restart the vehicle. Additionally, when it is determined that the mobile device has transitioned to outside the vehicle, the GPS location corresponding to the location of the vehicle at that time may be stored and presented to the user such that the user can return to the location at which the mobile device was lost.

Figure 2:
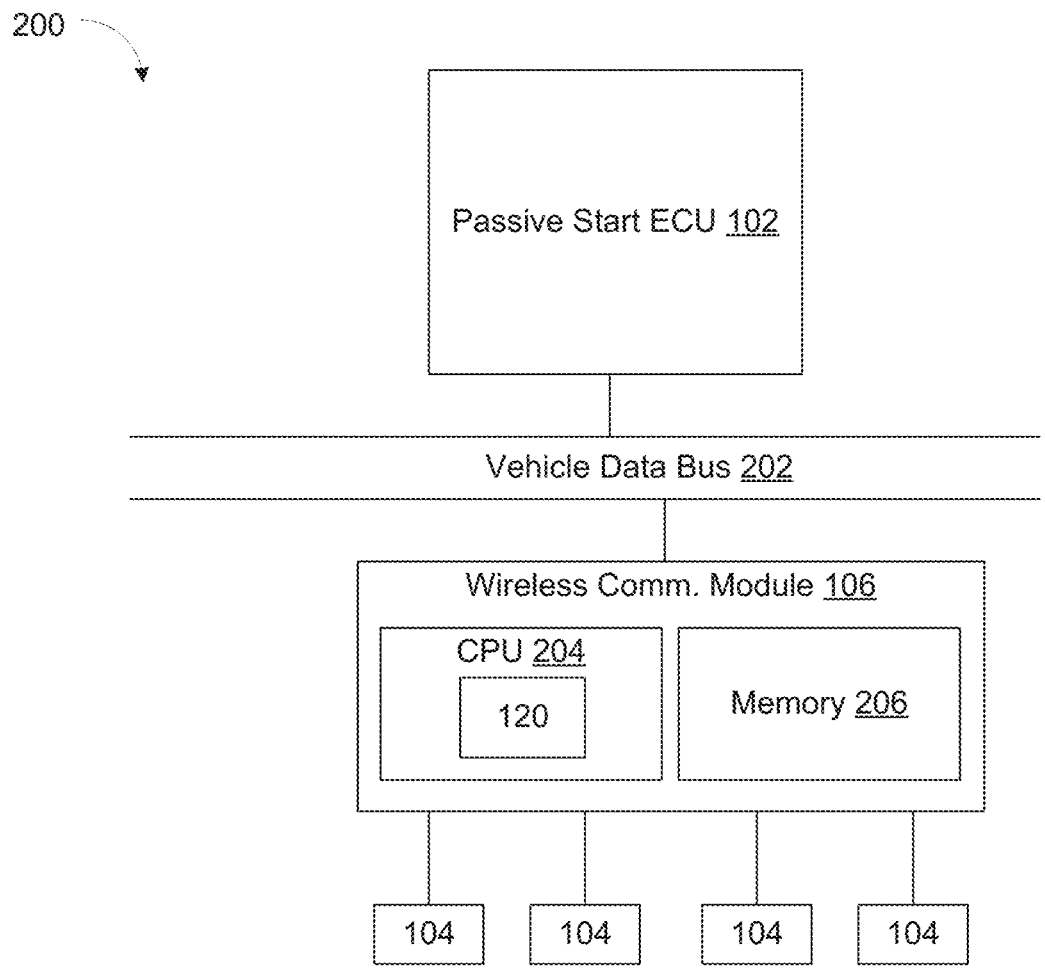
FIG. 2 is a block diagram of electronic components of the vehicle of FIG. 1.

FIG. 2 is a block diagram of electronic components 200 of the vehicle 100 of FIG. 1. In the illustrated example, the electronic components 200 include the passive start ECU 102, the antenna modules 104, the wireless communication module 106, and a vehicle data bus 202.

The wireless communication module 106 includes a processor or controller 204 and memory 206. In the illustrated example, the wireless communication module 106 is structured to include the LUA manager 120. Alternatively, in some examples, the LUA manager 120 is incorporated into another electronic control unit (ECU) with its own processor and memory, such as the PS ECU 102. The processor or controller 204 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 206 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc.). In some examples, the memory 206 includes multiple kinds of memory, particularly volatile memory and non-volatile memory.

The memory 206 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 206, the computer readable medium, and/or within the processor 204 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The vehicle data bus 202 communicatively couples the PS ECU 102 and the wireless communication module 106. In some examples, the vehicle data bus 202 includes one or more data buses. The vehicle data bus 202 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 3:
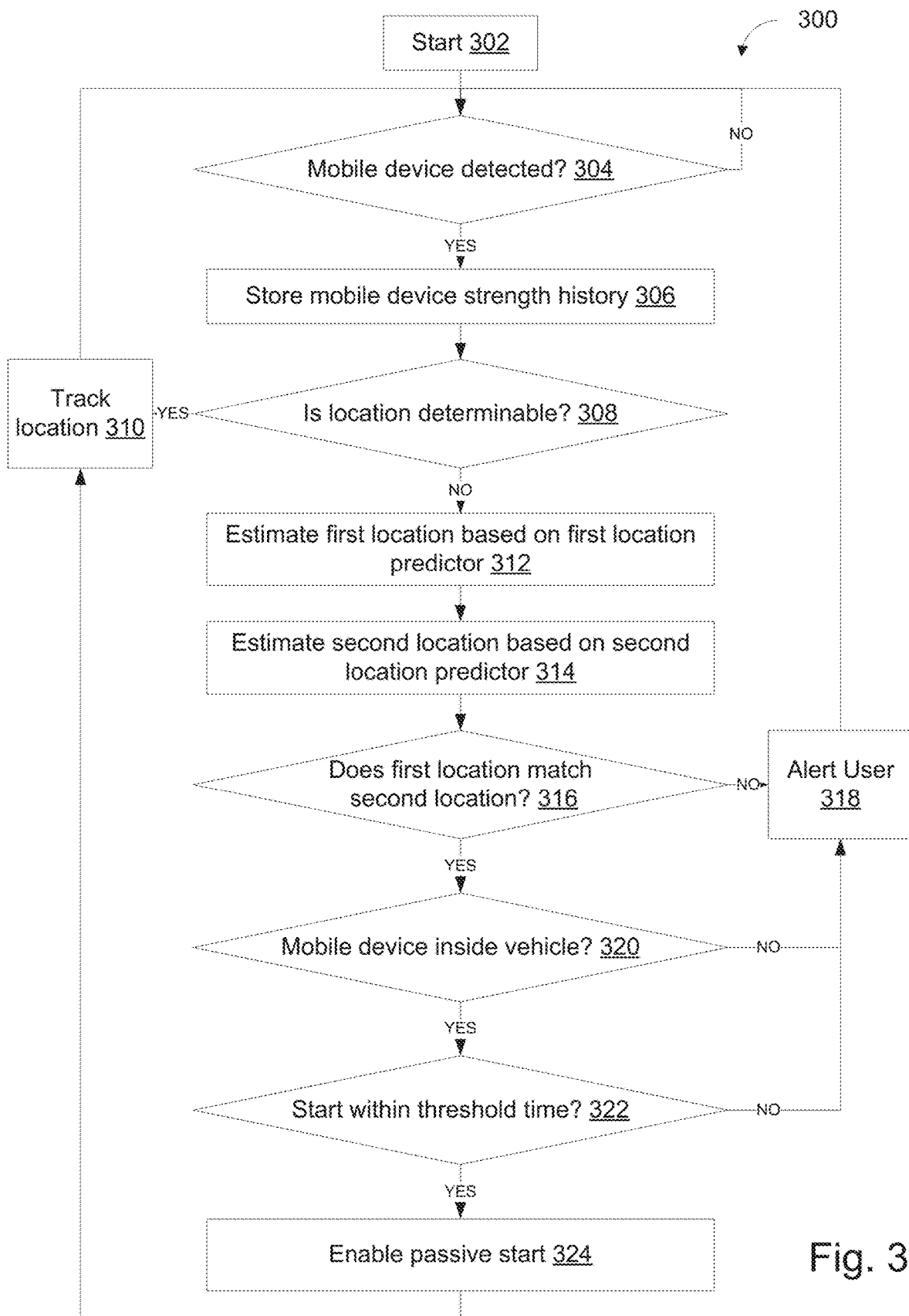
FIG. 3 is a flowchart of an example method for managing location uncertainty areas in a vehicle in connection with a passive start system of the vehicle, which may be implemented by the electronic components of FIG. 2.

FIG. 3 is a flowchart of an example method to manage LUAs in a vehicle having a passive start system, which may be implemented by the electronic components 200 of FIG. 2. Method 300 may start at block 302.

At block 304, method 300 may include determining whether a mobile device has been detected. This may include the LUA manager waiting until the mobile device 108 is in range of one or more of the antenna modules. At block 306, when the mobile device 108 is within range, the LUA manager 120 may store the signal strength measurements from the mobile device 108 in memory.

At block 308, the LUA manager 120 may determine whether the location or zone of the mobile device 108 is determinable (e.g. whether the mobile device 108 is possibly within one of the LUAs 116A-F) based on the signal strength measurements from the antenna modules 104. For example, the LUA manager 120 may not be able to determine the location or zone of the mobile device 108 when the signal strength measurements from the antenna modules 104 are close enough that the LUA manager 120 cannot determine to which antenna modules 104 the mobile device 108 is closest. When the location of the mobile device 108 is determinable, the method continues to block 310. Otherwise, the location of the mobile device 108 is not determinable, and the method continues at block 312. At block 310, the LUA manager 120 may determine and track the location of the mobile device 108 relative to the vehicle 100 based on the signal strength measurement.

At block 312, the LUA manager 120 may generate a first estimated location of the mobile device 108 based on a first predictor. The first predictor may be generated using a first model, such as a Kalman filter, an enhanced Kalman filter, or a double exponential smoothing algorithm. At block 314, the LUA manager 120 may generate a second estimated location of the mobile device 108 based on a second predictor that is different that the first predictor. The second predictor may be generated using a second model, such as a Markov Chain algorithm or a Bayesian net algorithm or a neural net network.

At block 316, the LUA manager 120 may determine whether the first and second locations match. The first and second locations match, for example, when the first and second locations are within a threshold distance of each other or when the first and second predictors indicate that the mobile device 108 is in the same zone, LUA, or other predetermined area. When the first and second locations match, the method continues at block 320. Otherwise, if the first and second locations do not match, the method continues at block 318.

At block 318, method 300 includes providing an alert to a user of the vehicle 100. The alert may indicate to the user that the mobile device is unable to be used for passive start because it cannot be located. The alert may also provide one or both of the predicted locations of the mobile device, such that the user can search the vehicle more efficiently to recover the lost mobile device.

At block 320, the LUA manager 120 may determine whether the mobile device 108 is inside the vehicle, and/or inside a specific area of the vehicle designated for passive start, based on the estimated location of the mobile device 108. When the mobile device 108 is within the vehicle/passive start zone, the method continues at block 322. Otherwise, when the mobile device 108 is not within the vehicle/passive entry zone, the method continues at block 318. At block 318, the user may be alerted that the mobile device is not inside the vehicle, or is not inside a designated area for passive start. The alert may provide a route back to a GPS location where the mobile device was last inside the vehicle (e.g., where the mobile device was lost), or may request that the driver move the mobile device to the designated passive start zone.

At block 322, the LUA manager 120 determines whether the user has selected the passive start button or option on a user interface of the vehicle 100 within a predetermined period of time (e.g., three seconds, five seconds, ten seconds, etc.). If the user has selected passive start within the threshold period of time, the method continues to block 324, wherein passive start is enabled. Otherwise, if the user has not selected passive start within the threshold period of time, the method continues at block 318 where the user is alerted that passive entry has been disable due to the location of the mobile device within an LUA.

At block 318, the nature of the alert may signify which error condition (e.g., the first and second location not matching, the mobile device not being in the passive start zone, passive start not being selected within the threshold time, etc.) is communicated through the alert. In some examples, to provide the alert, the LUA manager 120 may instruct the PS ECU 102 to produce an audio or visual alert using lights of the vehicle 100 and/or sound generating devices (e.g., horns, speakers, etc.) on the vehicle 100.

The flowchart of FIG. 3 is representative of machine readable instructions stored in memory (such as the memory 206 of FIG. 2) that comprise one or more programs that, when executed by a processor (such as the processor 204 of FIG. 2), cause the wireless communication module 106 and/or, more generally, the vehicle 100 to implement the example LUA manager 120 of FIGS. 1 and 2. Further, although the example program(s) is/are described with reference to the flowchart illustrated in FIG. 3, many other methods of implementing the example LUA manager 120 may alternatively be used. For example, the order of execution of the blocks may be changed, and/or some of the blocks described may be changed, eliminated, or combined.

In this disclosure examples may be described with respect to use of the disclosed concepts in relation to a passive start of a vehicle. However it should be understood that the same principles may apply to other scenarios in which it is beneficial to determine whether the vehicle is not present in the cabin of the vehicle. These examples may include many of the same features disclosed above, with minor differences based on the intended purpose or use of the detected locations of various devices.

For example, alternative embodiments may include a proper smart unlock function, wherein the vehicle prevents locking from the interior door trim when the door is open if the key is detected inside the cabin. This can include determining the position of the key within one or more LUAs, so as to avoid unintentionally locking the driver out of the vehicle.

Another example may include a proper passive lock from exterior function, wherein the vehicle prevents locking if the key is detected inside the vehicle and no key (e.g., smartphone with PaaK) is detected outside the vehicle. The position of one or more devices may be determined even when in LUAs so as to avoid unintentionally locking the driver out of the vehicle.

Further examples may include ensuring that remote park assist maneuvers (RePA), remote trailer hitch assist (ReTHA), and remote trailer maneuver assist (ReTMA) are not performed when the remote device controlling the remote maneuver is detected inside the vehicle.

And further, examples may include using the concepts disclosed herein for the purpose of forgotten phone assistance, to indicate to a user where a phone is and help him or her find it should the user lose sight of it.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
    antenna modules for determining a signal strength of communication with a mobile device; and
    a wireless module configured to:
        determine that the mobile device is in a location uncertainty area (LUA), wherein the LUA comprises an area inside the vehicle for which location of the mobile device cannot be determined based on signal strengths determined by the antenna modules;
        determine, based on the determination that the mobile device is in the LUA, first and second location predictors for the mobile device;
        determine that the first and second location predictors both indicate the mobile device is inside the vehicle; and
        enable, based on the determination that the first and second location predictors both indicate the mobile device is inside the vehicle, a passive start of the vehicle.

2. The vehicle of claim 1, wherein the wireless module is further configured to:
    track the location of the mobile device based on a measured signal strength of the mobile device before the mobile device enters into the LUA.

3. The vehicle of claim 1, having a plurality of LUAs, wherein the plurality of LUAs are based on coverage areas of the antenna modules.

4. The vehicle of claim 1, wherein the wireless module is further configured to:
    determine the first location predictor using a first model; and
    determine the second location predictor using a second model, the second model being determined based on a different technique than the first model.

5. The vehicle of claim 1, wherein the first and second location predictors are estimated locations of the mobile device within the LUA.

6. The vehicle of claim 1, wherein the wireless module is further configured to:
    determine that the first and second location predictors match; and
    enable, based on the determination that the first and second location predictors match, passive start of the vehicle for a limited amount of time.

7. The vehicle of claim 1, further comprising a plurality of LUAs, wherein the wireless module is further configured to:
    determine that the first and second location predictors match; and
    determine, based on the determination that the first and second location predictors match, a target LUA of the plurality of LUAs in which the mobile device is located.

8. The vehicle of claim 7, wherein the target LUA is determined based on at least one of: a comparison of vehicle acceleration and vehicle heading to mobile device acceleration and mobile device heading; a presence of a wired connection between the mobile device and the vehicle; the presence of the mobile device on a wireless charging pad having a known location in the vehicle; an analysis of sound from a microphone of the mobile device; an analysis of camera data from the mobile device; inertial data; and Global Positioning System (GPS) data.

9. The vehicle of claim 7, wherein the wireless module is further configured to display an alert on a vehicle display indicating that the mobile device is located in the target LUA.

10. The vehicle of claim 7, wherein the wireless module is further configured to transmit a command to the mobile device to cause the mobile device to emit a sound.

11. The vehicle of claim 1, wherein the wireless module is further configured to:
 determine that either one or both of the first and second location predictors indicate the mobile device is outside of the vehicle; and
 disable, based on the determination that either one or both of the first and second location predictors indicate the mobile device is outside of the vehicle, a passive start of the vehicle.

12. A method comprising:
 determining, with antenna modules of a vehicle, a signal strength of communication with a mobile device;
 determine that the mobile device enters a location uncertainty area (LUA), wherein the LUA comprises an area inside the vehicle for which location of the mobile device cannot be determined based on signal strengths determined by the antenna modules;
 determining, based on the determination that the mobile device enters the LUA, first and second location predictors for the mobile device;
 determining that the first and second location predictors both indicate the mobile device is inside the vehicle; and
 enabling, based on the determination that the first and second location predictors both indicate the mobile device is inside the vehicle, a passive start of the vehicle.

13. The method of claim 12, further comprising:
 determining the first location predictor using a first model; and
 determining the second location predictor using a second model, the second model being determined based on a different technique than the first model.

14. The method of claim 12, further comprising:
 determining that either one or both of the first and second location predictors indicate the mobile device is outside of the vehicle; and
 disabling, based on the determination that either one or both of the first and second location predictors indicate the mobile device is outside of the vehicle, a passive start of the vehicle.

15. The method of claim 12, further comprising:
 determining that the first and second location predictors match; and
 determining, based on the determination that the first and second location predictors match, a target LUA of a plurality of LUAs in the vehicle in which the mobile device is located.

16. The method of claim 15, wherein the target LUA is determined based on at least one of: a comparison of vehicle acceleration and vehicle heading to mobile device acceleration and mobile device heading; a presence of a wired connection between the mobile device and the vehicle; the presence of the mobile device on a wireless charging pad having a known location in the vehicle; an analysis of sound from a microphone of the mobile device; an analysis of camera data from the mobile device; inertial data; and Global Positioning System (GPS) data.

17. The method of claim 15, further comprising displaying an alert on a vehicle display indicating that the mobile device is located in the target LUA.

18. The method of claim 15, further comprising transmitting a command to the mobile device to cause the mobile device to emit a sound.

19. A vehicle comprising:
 antenna modules for determining a signal strength of communication with a mobile device;
 a first location uncertainty area (LUA) and a second LUA, the first LUA and the second LUA being located inside the vehicle; and
 a wireless module configured to:
  determine that the mobile device is in either the first LUA or the second LUA;
  determine, based on the determination that the mobile device is in the first LUA or the second LUA, first and second location predictors for the mobile device;
  determine that the first and second location predictors match;
  determine, based on the first and second location predictors matching; and
  enable passive start when the first and second location predictors both indicate the mobile device is inside the vehicle.

20. The vehicle of claim 19, wherein the wireless module is further configured to:
 determine that either one or both of the first and second location predictors indicate the mobile device is outside of the vehicle; and
 disable, based on the determination that either one or both of the first and second location predictors indicate the mobile device is outside of the vehicle, a passive start of the vehicle.

* * * * *